United States Patent
Quer et al.

(10) Patent No.: US 8,243,414 B2
(45) Date of Patent: Aug. 14, 2012

(54) ELECTROSTATIC DEVICE FOR DAMPING A MECHANICAL VIBRATION MOVEMENT OF A RESONANT MOVING OBJECT

(75) Inventors: Régis Quer, Saint Peray (FR); Christophe Taurand, Valence (FR)

(73) Assignee: Thales, Neuilly-sur-Seine (FR)

( * ) Notice: Subject to any disclaimer, the term of this patent is extended or adjusted under 35 U.S.C. 154(b) by 450 days.

(21) Appl. No.: 12/665,413

(22) PCT Filed: Jun. 16, 2008

(86) PCT No.: PCT/EP2008/057549
§ 371 (c)(1),
(2), (4) Date: Jan. 19, 2010

(87) PCT Pub. No.: WO2008/155312
PCT Pub. Date: Dec. 24, 2008

(65) Prior Publication Data
US 2010/0181156 A1    Jul. 22, 2010

(30) Foreign Application Priority Data
Jun. 19, 2007  (FR) ...................... 07 04362

(51) Int. Cl.
*H01T 23/00* (2006.01)
(52) U.S. Cl. ........................................ 361/233

(58) Field of Classification Search ............... 361/233
See application file for complete search history.

(56) References Cited

U.S. PATENT DOCUMENTS

| | | | |
|---|---|---|---|
| 4,104,920 A | 8/1978 | Albert et al. | |
| 5,675,296 A | 10/1997 | Tomikawa | |
| 5,729,075 A * | 3/1998 | Strain | 310/309 |
| 6,374,677 B1 * | 4/2002 | Berlin et al. | 73/662 |
| 6,930,487 B2 * | 8/2005 | North, Jr. | 324/457 |

FOREIGN PATENT DOCUMENTS

| | | |
|---|---|---|
| EP | 0431807 A1 | 6/1991 |
| GB | 514418 A | 11/1939 |

* cited by examiner

*Primary Examiner* — Stephen W Jackson
(74) *Attorney, Agent, or Firm* — Baker & Hostetler LLP

(57) ABSTRACT

An electrostatic device for damping a mechanical vibration movement of a moving object, the moving object being made of an electrically conductive material, the movement of the moving object having at least one parasitic vibration mode of frequency $f_p$ to be damped, the device comprising an electrode ELE forming, with the moving object, a gap of capacitance C voltage-biased with a DC voltage $V_0$ by a biasing circuit, the biasing circuit comprising, electrically connected in series with the electrode ELE: a load resistance R; possibly an inductance L; a parasitic capacitance $C_p$, characterized in that the biasing circuit further includes an electronic compensating device DEC having an impedance $Z_{eq}$, which comprises a capacitance component $C_{eq}$, a resistance component $R_{eq}$, and possibly an inductance component $L_{eq}$.

4 Claims, 5 Drawing Sheets

ELECTROSTATIC DEVICE FOR DAMPING A MECHANICAL VIBRATION MOVEMENT OF A RESONANT MOVING OBJECT

CROSS-REFERENCE TO RELATED APPLICATIONS

This application is a National Stage of International patent application PCT/EP08/057,549, filed on Jun. 16, 2008, which claims priority to foreign French patent application No. FR 0704362, filed on Jun. 19, 2007, the disclosures of which are hereby incorporated by reference in their entirety.

FIELD OF THE INVENTION

The field of the invention is the selective damping of vibration modes. The invention is of particular interest in reducing the parasitic vibration modes of a resonant electromagnetic sensor.

BACKGROUND OF THE INVENTION

It is known that resonant electromagnetic sensors can be used to measure different physical values: pressure, acceleration or angular velocity. Such sensors have a vibrating structure: it is based on exploitation of a particular vibration mode of the vibrating structure, called the "useful mode", that a value is determined which is linked to the physical variable which is to be accurately measured. For example, a variation in the vibration frequency of the vibrating beam of a pressure sensor permits determination of the pressure acting on the beam.

It is often necessary to rely on the high mechanical Q of the useful modes. Such Q values are generally obtained by means of optimization between three main factors:

- a choice of the material of the vibrating structure, which most frequently results in the selection of crystalline material;
- a mechanical structure design which must be adapted to the useful mode selected, and
- creation of a relatively high vacuum around the vibrating structure.

In parallel, the presence of parasitic modes may result in impairment of sensor performance because such presence also acts on the useful mode. This impairment is often all the more significant when the parasitic mode has a high Q.

Of the solutions taken from the prior art for damping these parasitic modes, mention may be made, for example, of: piezoelectric active or passive damping, gas damping, damping by means of a mechanical coupling with other more damped modes and lastly damping by addition of materials with significant mechanical losses, e.g. adhesives.

These various solutions are not perfect and each has certain disadvantages. In particular, piezoelectric damping requires the deposition of piezoelectric material on substrates as well as the deposition of electrodes: these deposits represent the addition of materials whose properties impair the sensor performance. Moreover, gas damping requires the encapsulation of the vibrating structures in a specified atmosphere and assurance of the stability of this atmosphere over time. Apart form the necessity to confine the gases in certain areas close to the structures, which results in high costs for its implementation and for ensuring it is kept in working order, this solution also has the disadvantage that it damps all vibration modes: the useful modes just as much as the parasitic modes.

It is generally accepted that prior art solutions for the damping of parasitic vibrations induce the following disadvantages: an addition of material impairing sensor performance, an absence of selectivity in the vibration modes which are damped, an increase in complexity of the mechanical structure of the sensors and lastly a significant increase in the fabrication costs of the latter.

SUMMARY OF THE INVENTION

The aim of the invention is to overcome these disadvantages. More precisely, the object of the invention is an electrostatic device for damping a mechanical vibration movement of a moving object, the moving object being made of an electrically conductive material, the movement of the moving object having at least one parasitic vibration mode of frequency $f_p$ to be damped, the device comprising an electrode forming, with the moving object, a gap of capacitance voltage-biased with a DC voltage by a biasing circuit, the biasing circuit comprising, electrically connected in series with the electrode:

a load resistance;
an inductance;
a parasitic capacitance, characterized in that the biasing circuit further includes an electronic compensating device having an impedance, which comprises an inductance component, a capacitance component and a resistance component.

A first advantage of the device according to the invention lies in the selectivity of the damping which it achieves. This selectivity can relate both to the mode which is being damped but also to a predetermined frequency band. Thus, thanks to the invention, it is possible to select one or more vibration modes which it is desired to damp and to assign a given surge factor to it or them over a specified frequency bandwidth. Possibly the bandwidth is 100 hertz.

A second advantage of the inventive damping device arises from the fact that it damps the parasitic modes without requiring the addition of solid material to the sensor elements, as for example a deposit of piezoelectric material on a moving part of the vibrating structures.

A third advantage of the inventive device arises from the fact that it does not require encapsulation of the sensor in a hermetically sealed container to guarantee a particular atmosphere.

Another advantage of the invention arises from the reversible and activatable characteristics of the inventive device. Hence an electromagnetic sensor comprising an inventive device need not make the device function in order to carry out a measurement. When the inventive device is out of service, the sensor comprising the device can nevertheless still carry out a measurement. This facility allows the inventive device to play a preventative role, for example to compensate for sensor impairments arising during the sensor aging process, for example by incorporating it into an auto-test and sensor monitoring device.

Lastly, a final advantage offered by the inventive device is moreover to permit compensation of the effects of a parasitic capacitance appearing in the sensor.

BRIEF DESCRIPTION OF THE DRAWINGS

Other features and advantages of the invention will become apparent from reading the detailed description which follows, given as a non-limiting example and by referring to the attached drawings in which:

FIG. 1b represents a circuit diagram equivalent to the damping device associated with the mass-spring system represented in FIG. 1a;

DETAILED DESCRIPTION

The same elements are represented by the same references in all the figures.

Figure 1B:
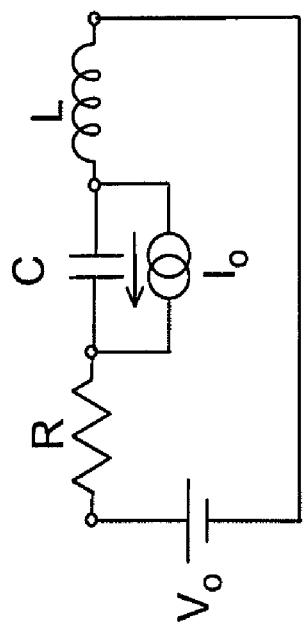
Figure 1A:
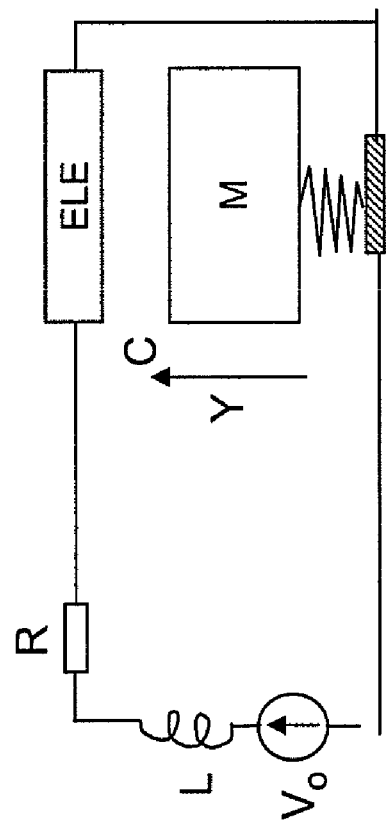
FIG. 1a represents a block diagram of a damping device associated with a mass-spring system representative of a resonance mode to be damped.

Let us consider a vibration mode of an electromagnetic sensor that it is wished to damp: this mode of vibration can be represented by a mass-spring system, as for example in FIG. 1a. In this case, the mass-spring system is comprised of a seismic mass M linked to a spring with a stiffness constant k. The seismic mass moves with a frequency equal to $f_M = \frac{1}{2\pi}\sqrt{(k/m)}$ which corresponds to the vibration mode to be damped.

This schematic representation may perfectly well correspond to an actual situation; for example, it applies to a planar electromagnetic sensor comprises a moving structure, a device for detecting movement along an axis of sensitivity Y in the plane and a force amplifying device for increasing the sensor sensitivity. M is the seismic mass of the moving structure and k is an equivalent stiffness constant along the sensitivity axis of the force amplification device.

It is known that damping of the vibration mode can be achieved by a transfer of energy from the mass-spring system to an electrical dissipation element R. The energy transfer is realized by positioning an electrode ELE close to the seismic mass. The electrode is biased with a DC voltage $V_0$ and the electrical dissipation element R is placed in series in an electrode ELE biasing circuit.

The electrode ELE and seismic mass M form a gap of capacitance C. When an inductance L is inserted in series in the biasing circuit and when this inductance L is chosen so as to be tuned to the capacitance C of the gap, the electric current passing through the electrical dissipation element R is maximized, while reactive energy is avoided.

The circuit diagram describing a damping electrostatic device is represented in FIG. 1b. In this case, the power P dissipated by the Joule effect in the electrical dissipation element R is:

$$P = \frac{R|I_0|^2}{2\left[\left(1 + \frac{\omega^2}{\omega_0^2}\right)^2 + R^2C^2\omega^2\right]} \text{ where } \omega_0^2 = 1/(L.C).$$

The power P is maximum when $\omega = \omega_0$. If the inductance L is chosen such that $1/(L \cdot C) = (2\pi)^2 \cdot (f_M)^2$, i.e. such that the resonant frequency of the electrical biasing circuit corresponds to the frequency of the mode to be damped, the maximum power P corresponds to maximum attenuation of the mode to be damped.

To locate the orders of magnitude in a MEMS, such as a micromachined accelerometer, a seismic mass has lateral dimensions in the range of a few micrometers up to a few millimeters. For example, when a moving mass which has a length l=5 mm and a width L=60 μm, is placed at a distance d=3.5 μm from an electrode of the same dimensions, the gap capacitance has a value equal to $\epsilon_0 \cdot l \cdot L/d$, where $\epsilon_0$ is the permittivity in a vacuum, equal to $8.85 \times 10^{-12}$ C2/(N×m²), i.e. the capacitance C has a value equal to about 750 fF. Hence for a frequency value $f_M$ to be damped which is equal to 4 kilohertz, the inductance value L needs to be equal to about 2000 henries. This extremely high inductance value cannot be attained using a simple electronic component.

Figure 2:
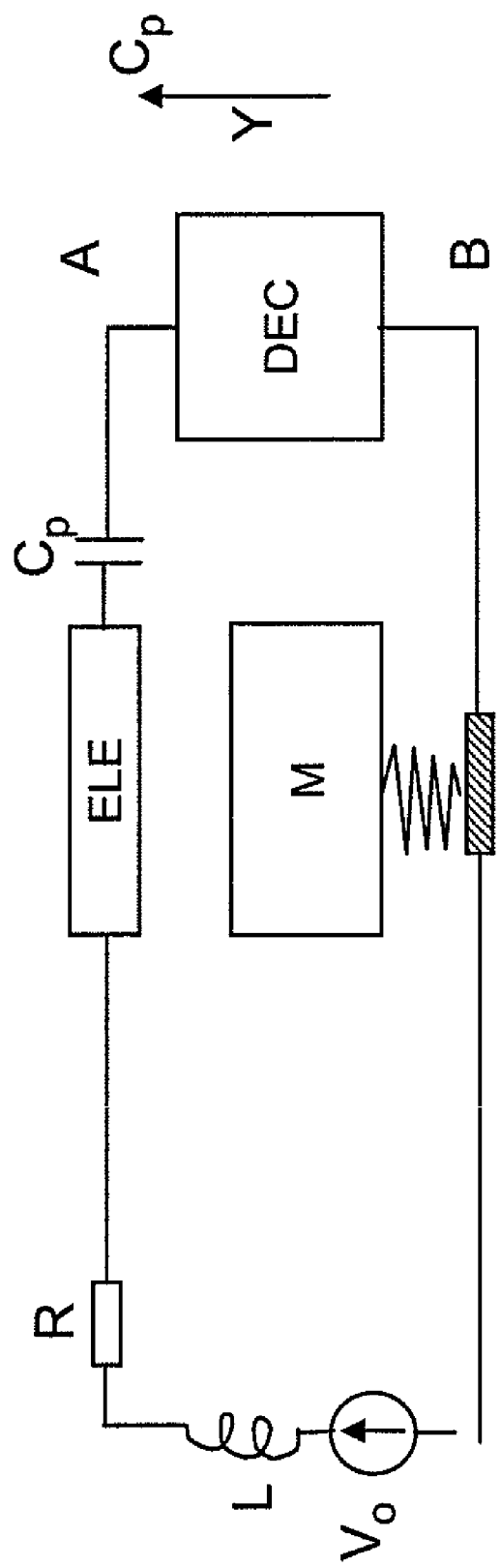
FIG. 2 represents a first example of the biasing circuit comprising an electronic compensating device of an inventive damping device.
Figure 3B:
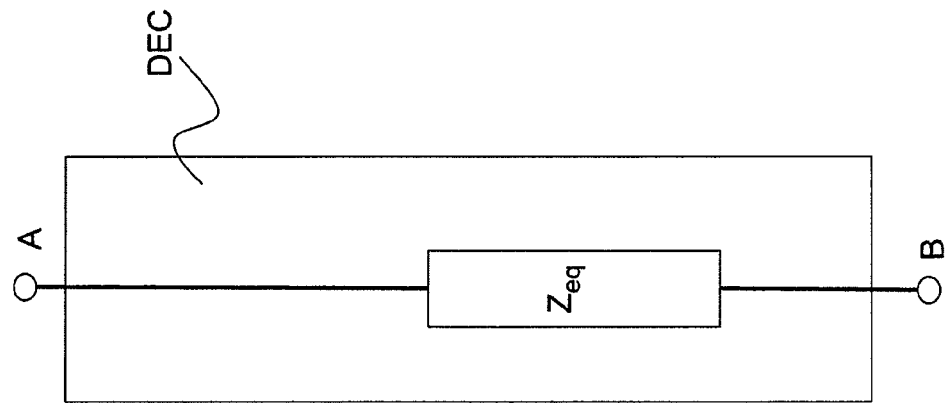
FIG. 3b represents the equivalent circuit diagram of the first embodiment.
Figure 3A:
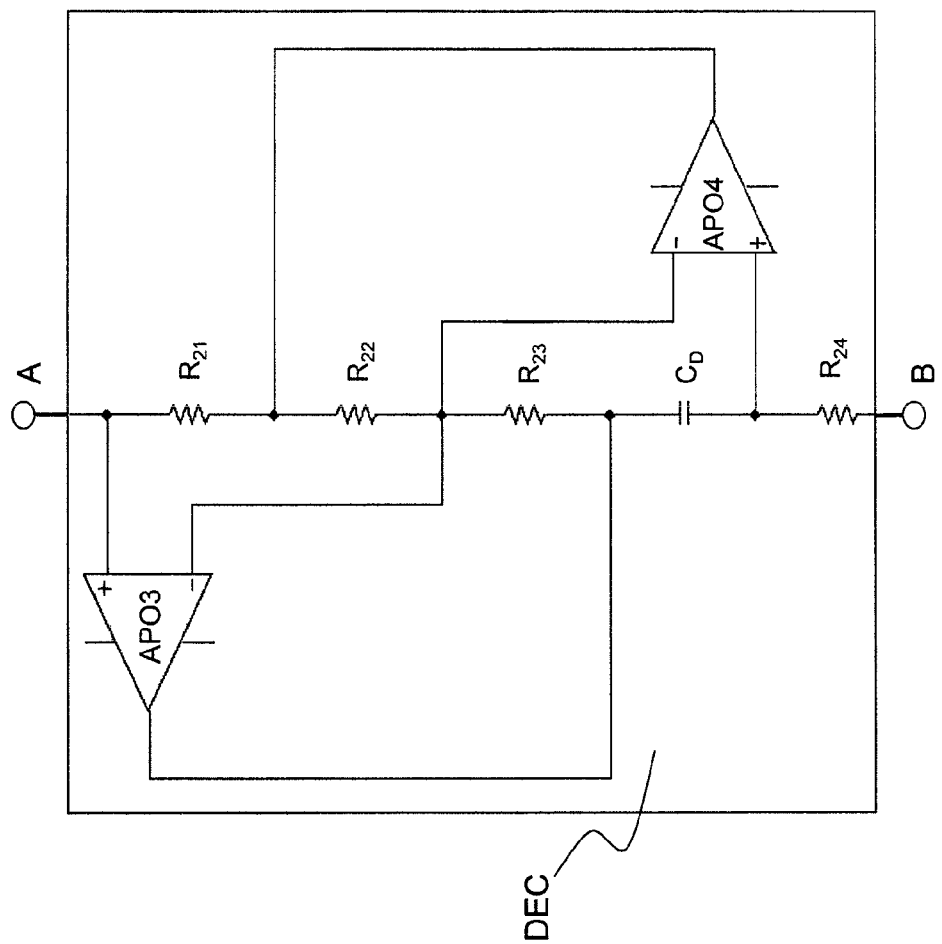
FIG. 3a represents a first embodiment of an electronic compensating device of an inventive damping device.

Nevertheless, it is possible to emulate a very high inductance value by inserting in series in the biasing circuit an electronic compensating device DEC of impedance $Z_{eq}$ with a non-zero inductance value, as illustrated in FIG. 2. A first embodiment of a compensating device of the inventive damping device is shown in FIG. 3a.

Advantageously, if the inductance component $L_{eq}$ has a non-zero value, the capacitance C and the inductance component $L_{eq}$ are linked to $f_p$ by an equation of the form:

$$\frac{1}{\sqrt{(L+L_{eq}) \cdot C}} = 2\pi \cdot f_p.$$

This device is known as a "gyrator assembly". FIG. 3b represents a circuit equivalent to that presented in FIG. 5a. The equivalent inductance $L_{eq}$ equals $R_{23}*C*R_{24}/R_{22}$. The values of the various resistances of the electronic compensating device are adjusted such that L and $L_{eq}$ are linked to $f_p$ by the equation shown above.

An alternative solution involves the realization of biasing circuits comprising a zero-value inductance. In this case, the power P dissipated by the Joule effect may be expressed in the following form:

$$P = \frac{R|I_0|^2}{2[1+R^2C^2\omega^2]}$$

The power P is maximum for $RC\omega=1$ and is then equal to $$\frac{R \cdot |I_0|^2}{4}.$$

Advantageously, if the inductance L has a zero value and if the inductance component $L_{eq}$ has a zero value, the load resistance R and the capacitance C are linked to $f_p$ by an equation of the form $R \cdot C = 1/(2\pi \cdot f_p)$.

In practice, for electromechanical sensors made by machining a silicon SOI substrate, it is very difficult to avoid a parasitic capacitance $C_p$ appearing in series with the gap capacitance C of the biasing circuit: the circuit diagram similar to that presented in FIG. 2. It can be shown that the damping performance is impaired, i.e. that the dissipated power P is reduced, by this parasitic capacitance $C_p$, in fact, by setting $C_T = C + C_p$, the power P takes on the following expression:

$$P = \frac{2d^2M\omega^2}{CV_0^2} \cdot \frac{1+(RC_T\omega)^2}{2RC\omega}$$

where d is the distance separating the seismic mass of the vibrating structure from the electrode and M is the mass of the vibrating structure.

The problem posed by the impairment of the damping performance can be resolved by incorporating, in the biasing electrical circuit of the damping device, a compensating device which compensates for the effect of the parasitic capacitance.

Figure 4B:
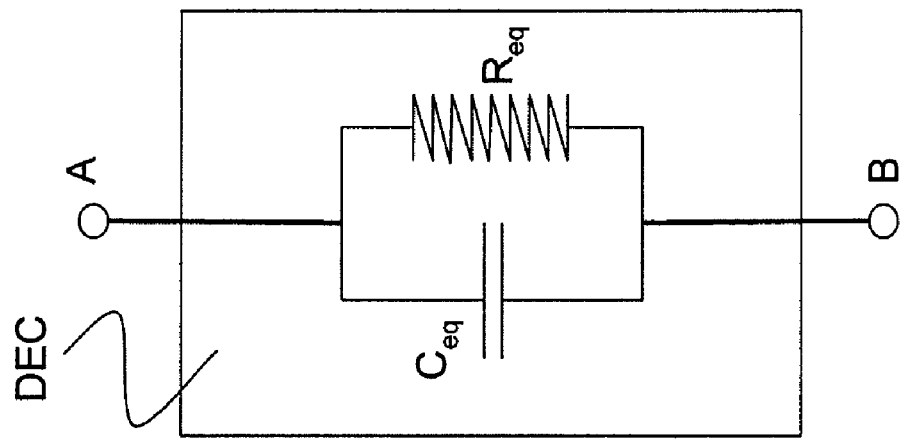
FIG. 4b represents the equivalent circuit diagram of the second embodiment.
Figure 4A:
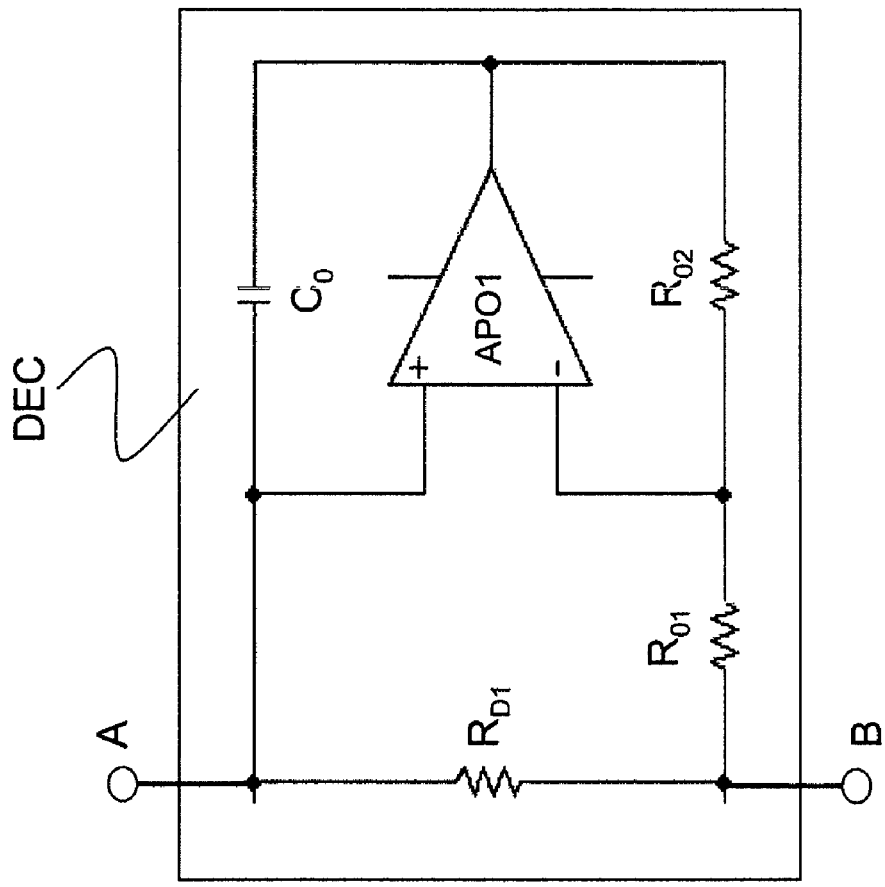
FIG. 4a represents a second embodiment of an electronic compensating device of an inventive damping device.

A second embodiment of a compensating device of the inventive damping device is shown in FIG. 4a. This electronic circuit which comprises an amplifier is known conventionally by its English acronym VNIC (meaning "Voltage Negative Impedance Converter"), it is equivalent to a resistance $R_{D1}$ connected in parallel with a capacitance of value $C_{eq} = -C \cdot R_{O2}/R_{O1}$ between the terminals A and B, as shown in FIG. 4b.

Advantageously, the capacitance component $C_{eq}$ has a value equal to $-C_p$.

Figure 5A:
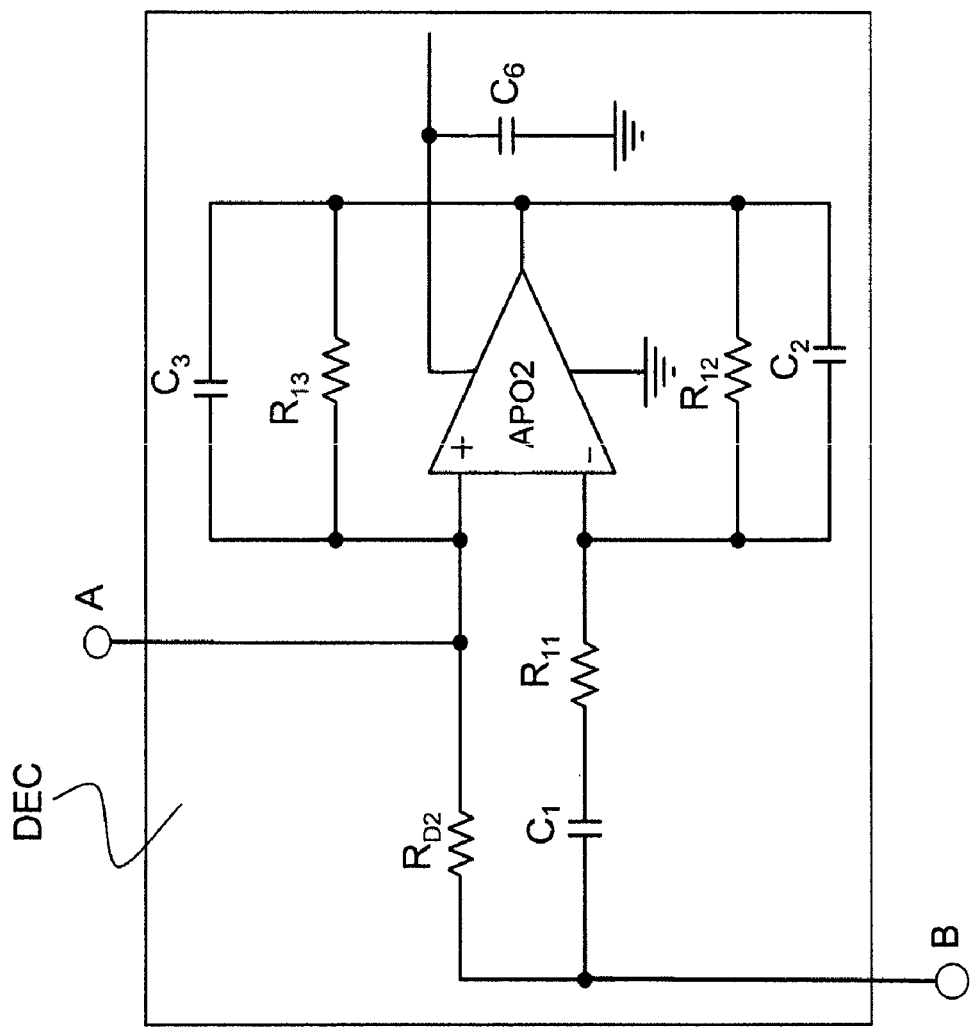
FIG. 5a represents a third embodiment of an electronic compensating device of an inventive damping device.
Figure 5B:
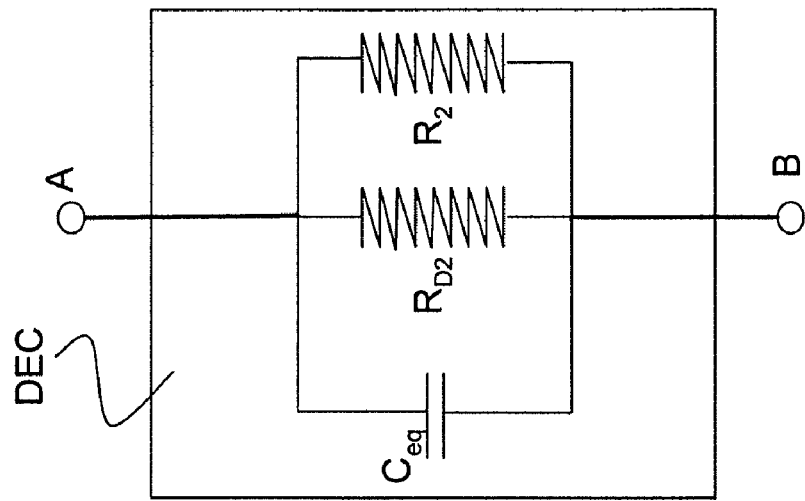
FIG. 5b represents the equivalent circuit diagram of the third embodiment.

A third embodiment of a compensating device of inventive damping device is shown in FIG. 5a. This electronic circuit is equivalent to three passive components connected in parallel, as shown in FIG. 5b:

a resistance $R_{D2}$
$R_2 = -C_3 \cdot Z_1/Z_2$
a capacitance of value $C_{eq} = -C_6 \cdot Z_2/Z_1$.

The following notation is employed $Z_1 = 1/jC_1\omega + R_{11}$ and $1/Z_2 = jC_2\omega + 1/R_{12}$ This third embodiment has the added interest of reducing the total resistance made up of the sum of $R_{eq}$ and R to reduce certain offset drifts.

Advantageously, the resistance component $R_{eq}$ has a value equal to $-R$.

The invention claimed is:

1. An electrostatic device for damping a mechanical vibration movement of a moving object, the moving object being made of an electrically conductive material, the movement of the moving object having at least one parasitic vibration mode of frequency $f_p$ to be damped, the device comprising an electrode ELE forming, with the moving object, a gap of capacitance C voltage-biased with a DC voltage $V_0$ by a biasing circuit, the biasing circuit comprising, electrically connected in series with the electrode ELE:

a load resistance R;
possibly an inductance L;
a parasitic capacitance $C_p$, wherein the biasing circuit further includes an electronic compensating device DEC having an impedance $Z_{eq}$, which comprises a capacitance component $C_{eq}$, a resistance component $R_{eq}$, and possibly an inductance component $L_{eq}$.

2. The device as claimed in claim 1, wherein the capacitance component $C_{eq}$ has a value equal to $-C_p$.

3. The device as claimed in claim 1, wherein if the inductance component $L_{eq}$ has a non-zero value, the capacitance C and the inductance component $L_{eq}$ are linked to $f_p$ by an equation of the $$\frac{1}{\sqrt{(L+L_{eq}) \cdot C}} = 2\pi \cdot f_p.$$

4. The device as claimed in claim 1, wherein if the inductance L has a zero value and if the inductance component $L_{eq}$ has a zero value, the load resistance R and the capacitance C are linked to $f_p$ by an equation of the form $R \cdot C = 1/(2\pi \cdot f_p)$.

* * * * *